United States Patent [19]

Fundak et al.

[11] Patent Number: 4,689,674
[45] Date of Patent: Aug. 25, 1987

[54] DUAL RESOLUTION POSITION CONTROL

[75] Inventors: Davorin Fundak, Beaverton; Larry R. Adams, Forest Grove, both of Oreg.

[73] Assignee: Tektronix, Inc., Beaverton, Oreg.

[21] Appl. No.: 780,146

[22] Filed: Sep. 26, 1985

[51] Int. Cl.⁴ .............................................. H04N 17/04
[52] U.S. Cl. .................... 358/139; 340/724; 324/121 R
[58] Field of Search .............. 358/139, 10; 343/5 DP; 334/33; 315/403, 410; 340/722, 731, 805, 744, 724; 324/121 R

[56] References Cited

U.S. PATENT DOCUMENTS

| | | | |
|---|---|---|---|
| 3,423,749 | 1/1969 | Newcomb | 340/805 |
| 3,491,200 | 1/1970 | Wisnieff | 340/744 |
| 3,882,502 | 5/1975 | Peabody et al. | 343/5 DP |
| 4,123,705 | 10/1978 | Olson | 358/10 |
| 4,149,189 | 4/1979 | Nagai | 358/139 |
| 4,249,171 | 2/1981 | Batcher | 340/722 |
| 4,346,333 | 8/1982 | Dagostino | 340/722 |

*Primary Examiner*—James J. Groody
*Assistant Examiner*—Victor R. Kostak
*Attorney, Agent, or Firm*—John Smith-Hill; Francis I. Gray

[57] ABSTRACT

A horizontal position control for a television waveform monitor includes a potentiometer that has a substantially linear input position/output voltage transfer function, and a circuit for reducing the sensitivity of the horizontal position control over a predetermined range of input positions of the potentiometer. The reduced sensitivity is preferably provided over a band approximately at the center of the range of horizontal positions covered by the horizontal position control.

2 Claims, 6 Drawing Figures

DUAL RESOLUTION POSITION CONTROL

This invention relates to a dual resolution position control for television waveform monitors.

BACKGROUND OF THE INVENTION

Television waveform monitors are used to provide a display in the time domain of the waveform of a baseband composite video signal, and to enable measurements to be made on those signals. A measurement that is typically made is the horizontal sync duration or width. Sync width is measured by observing the distance on the display between the −20 IRE points of the leading and trailing edges of the horizontal sync pulse. Knowing the horizontal magnification of the monitor, the sync width can be inferred.

A typical waveform monitor has a display screen that is about 4 inches (about 10 centimeters) wide, and at the lowest horizontal magnification setting two lines of the video signal can be displayed. For the sake of clarity, the line that is seen to the left will be referred to hereinafter as the first line and the line that is seen to the right, and has its sync pulse at about the middle of the displayed waveform, will be referred to as the second line. It will, however, be appreciated that there is no necessary numerical relationship between the positioning of the displays of the two lines and the numbering of the fields of the video signal, except to the extent that such a relationship may be imposed by the design of a particular waveform monitor.

The nominal sync width is about 4.7 μs, or about 7.4 percent of the duration of a single line of a video signal. This implies that at the lowest horizontal magnification setting the sync pulse occupies about 3.7 percent of the width of the display of a waveform monitor. Clearly, with a display screen that is about 10 cm wide, it is not possible to make accurate measurements on a feature that occupies less than 4 percent of the screen width simply by naked eye observation of graticules engraved on the display screen. Therefore, in order to make accurate measurements it is necessary to expand the displayed waveform in the horizontal direction by increasing the horizontal magnification so that the sync pulse occupies considerably more than 3.7 percent of the width of the display. In a conventional waveform monitor, however, the sensitivity of the instrument to horizontal position of the waveform increases as the horizontal magnification is increased. This is because the conventional waveform monitor often employs a single turn potentiometer to move the waveform horizontally on the display screen, and rotation of the potentiometer from its center position (in which the sync pulse of the second line is at about the center of the screen) through a predetermined angle (e. g. about 180 degrees in the case of a single turn potentiometer) causes the waveform to be displaced so that one end of the waveform (depending on the direction of rotation) is shifted right across the display screen, regardless of the horizontal magnification setting of the monitor. Consequently, when the horizontal magnification is increased ten-fold so that the sync pulse occupies about one-third of the width of the screen, the horizontal position control becomes ten-times more sensitive, and it is very difficult to position the sync pulse accurately relative to the graticule markings on the display screen with a single turn potentiometer.

SUMMARY OF THE INVENTION

In a preferred embodiment of the invention a horizontal position control for a television waveform monitor includes a potentiometer that has a substantially linear input position/output voltage transfer function, and a circuit for reducing the sensitivity of the horizontal position control over a predetermined range of input positions. In the preferred embodiment the reduced sensitivity is provided over a band approximately at the center of the range of horizontal positions covered by the horizontal position control. Accordingly, when the magnified sync pulse of the second line is shifted to left or right, the horizontal position control remains within its low sensitivity band so long as the sync pulse remains on screen.

BRIEF DESCRIPTION OF THE DRAWING

For a better understanding of the invention, and to show how the same may be carried into effect, reference will now be made, by way of example, to the accompanying drawing in which.

DETAILED DESCRIPTION

Figure 1:
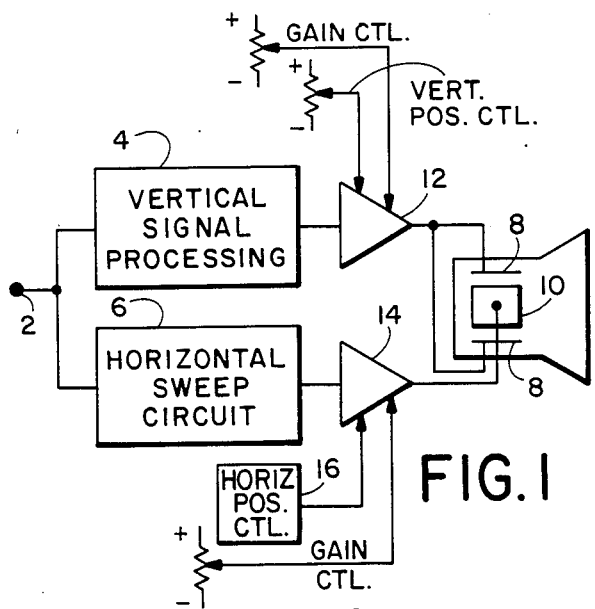
FIG. 1 illustrates a waveform monitor in simplified block form.

The waveform monitor shown in FIG. 1 receives a baseband video signal at its input terminal 2, and this signal is applied both to a vertical signal processing circuit 4 and to a horizontal sweep circuit 6. The horizontal sweep circuit generates a voltage ramp that repeats at half the line frequency of the video signal. The output terminals of the circuits 4 and 6 are applied to vertical and horizontal deflection plates 8 and 10 of a CRT through vertical amplifiers 12 and horizontal amplifiers 14 respectively. Each of the amplifiers has a gain control terminal and a position control terminal. Control voltages are applied to the gain and position control terminals. The position control voltage is applied to the horizontal amplifiers 14 as an offset to the sweep ramp at a position upstream of the gain control stage so that the position control offset is acted upon by the gain control stage.

Figure 2:
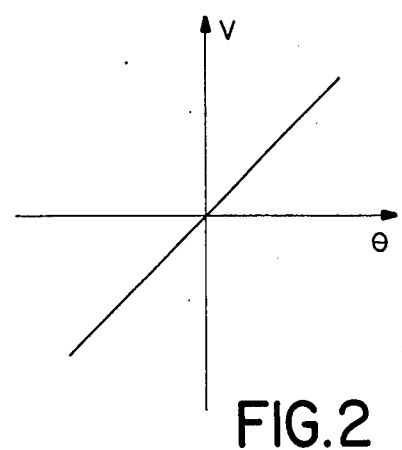
FIG. 2 illustrates the angular position/output voltage transfer function of the horizontal position control of a conventional waveform monitor.

In a conventional waveform monitor the horizontal position control 16 is simply a potentiometer having a linear angular position/output voltage transfer function, as shown in FIG. 2. Therefore, throughout the range of angular positions of the potentiometer, a given change in angular position is associated with the same change in output voltage, and so the sensitivity of the positioning of the waveform is constant over the entire viewable length of the waveform. This type of transfer function has the disadvantage discussed above.

Figure 3:
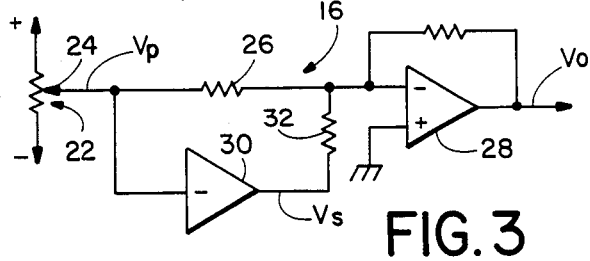
FIG. 3 illustrates, partly schematically and partly in block form, the horizontal position control for a waveform monitor embodying the present invention.
Figure 4A:
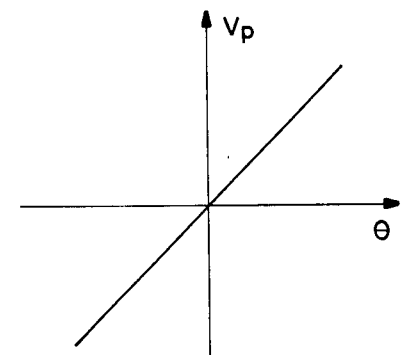
FIGS. 4A, 4B and 4C are graphs illustrating the angular position to output voltage transfer function of the horizontal position control illustrated in FIG. 3.
Figure 4B:
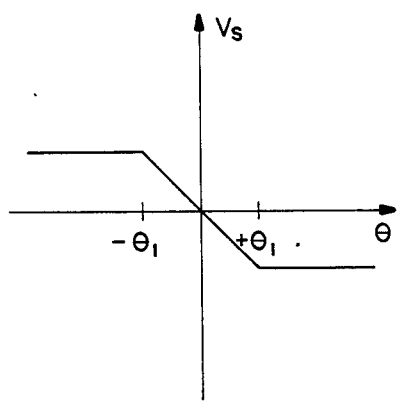

In a preferred embodiment of the invention, the horizontal position control 16 is constituted by the circuit shown in FIG. 3. The horizontal position control 16 shown in FIG. 3 of the drawings comprises a potentiometer 22 having a wiper 24. The angular position/output voltage transfer function of the potentiometer is a linear function, as illustrated in FIG. 4A of the drawings. The wiper 24 of the potentiometer is connected through a resistor 26 to the inverting input of an operational amplifier 28, and is also connected to the inverting input of a limiting amplifier 30. The angular position/voltage transfer function of the limiting amplifier 30 is as shown in FIG. 4B.

Figure 4C:
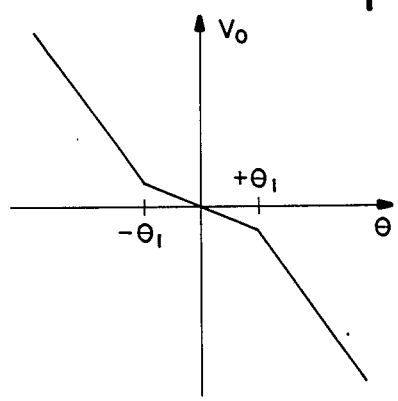

The output of the limiting amplifier 30 is connected through a resistor 32 to the inverting input of the amplifier 28, which acccordingly provides at its output the inverted sum $V_o$ of the output voltage of the limiting amplifier 30 and the voltage at the wiper of the potentiometer 22, which voltage sum $V_o$ is input to the position control terminal of the horizontal amplifier 14. Therefore, the angular position/output voltage transfer function of the horizontal position control 16 is the inverted sum of the transfer functions shown in FIGS. 4A and 4B, and is shown in FIG. 4C. The end points of the transfer function shown in FIG. 4C are the mirror images of those of the transfer function shown in FIG. 2, and consequently rotation of the potentiometer 22 through its full range of angular positions results in movement of the waveform right across the screen of the monitor from one side to the other. However, over about one-third of the range of angular positions of the potentiometer 22 (from $-\theta_1$ to $+\theta_1$), the slope of the transfer function is substantially reduced with respect to that shown in FIG. 2. Accordingly, a change in the angular position of the potentiometer 22 within that range of angular positions results in a much smaller change in the position of the waveform than occurs in the case of FIG. 2. This band of reduced sensitivity is selected to be centered about the central position of the potentiometer 22 so that regardless of the horizontal magnification setting of the waveform monitor, the horizontal sync pulse of the second line remains within the area of the display for all positions of the wiper of the potentiometer.

If in FIGS. 2 and 4 positive values of $\theta$ indicate positions of the potentiometer 22 that are clockwise from the center position and rotation of the potentiometer in the clockwise direction conventionally causes a shift in the displayed waveform to the right of the display screen, simply substituting the position control of FIG. 3 for the conventional position control, without more, will result in rotation of the potentiometer 22 in the clockwise direction causing the displayed waveform to shift to the left of the screen. This inversion in the operation of the control of FIG. 3 relative to the conventional position control may be eliminated by inverting the output signal from the amplifier 28 or reversing the polarity of the connections to the potentiometer 22.

It will be appreciated that the invention is not restricted to the particular horizontal position control that has been described and illustrated, and that variations may be made therein without departing from the scope of the invention as defined in the appended claims.

We claim:

1. A television waveform monitor comprising a display device having a display screen for displaying a visual representation of the waveform of two lines or fields of a composite video signal, first means for applying a horizontal position control voltage to the display device in order to adjust the horizontal position of the visual representation with respect to the display screen, second means for generating the horizontal position control voltage from an input voltage received by the second means, and a horizontal position control device having a mechanically movable input member and also having means for generating the input voltage that is received by the second means, the horizontal position control device having a substantially linear transfer function relating change in position of the input member to change in the amplitude of said input voltage, and said second means having a non-linear transfer function relating change in the amplitude of said input voltage to change in the amplitude of an output voltage such that over a limited range of positions of the input member the change in the amplitude of the horizontal position control voltage for a given change in position of the input member is less than for other positions of the input member.

2. A waveform monitor according to claim 1, wherein the horizontal position control device comprises a rotary potentiometer and the means for generating the input voltage includes a wiper of the potentiometer, and said second means comprise an amplifier having a signal input terminal connected to the wiper of the potentiometer and a signal output terminal, and means for additively combining the potential at the wiper of the potentiometer and the potential at the signal output terminal of the amplifier, and wherein the incremental gain of the amplifier is non-zero for values of the voltage applied to the signal input terminal corresponding to the limited range of positions of the input member and is zero for other positions of the input member.

* * * * *